United States Patent Office 3,464,969
Patented Sept. 2, 1969

3,464,969
SULFUR-CONTAINING POLYAMINES
Hans H. Stockmann, Plainfield, and Joseph Fertig, Elizabeth, N.J., assignors to National Starch and Chemical Corporation, New York, N.Y., a corporation of Delaware
No Drawing. Filed Apr. 18, 1968, Ser. No. 722,143
Int. Cl. C08g 33/06
U.S. Cl. 260—79                    10 Claims

ABSTRACT OF THE DISCLOSURE

High molecular weight polysulfur amidoamines comprising the products resulting from the reaction of polyalkylene polyamines with a sulfur-containing reagent as well as the chain extended products resulting from the reaction of the thus prepared amidoamines with an epihalohydrin. The chain extended and non-chain extended products are both applicable for use as pigment retention additives in paper, flocculants, antistatic agents and adhesion promoters.

SUMMARY OF THE INVENTION

It is the prime object of this invention to prepare novel, high molecular weight polysulfur amidoamines. It is an additional object to prepare chain extended derivatives of the latter products so as to further increase their molecular weight. Various other objects and advantages of this invention will become apparent to the practitioner from the following detailed description thereof.

Thus, the products of this invention comprise the novel polysulfur amidoamines which are produced by means of a condensation polymerization technique resulting in compositions containing, as part of the molecule thereof, a repetitive chemical structure corresponding to the formula:

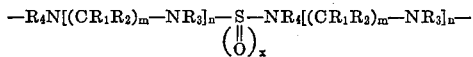

wherein $R_1$, $R_2$, $R_3$ and $R_4$ are radicals selected from the group consisting of hydrogen, alkyl and cycloalkyl radicals;

$m$ is an integer having a value of from 2 to 6 inclusive;
$n$ is an integer having a value of from 1 to 1000 inclusive; and
$x$ is an integer having a value of from 0 to 2 inclusive.

With regard to the chain extended products, i.e. the products resulting from the reaction of our novel polysulfur amidoamines with an epihalohydrin, it is exceedingly difficult to present an accurate structural formula thereof. Thus, as the chain extension reaction proceeds and an increasing amount of condensation occurs with the epihalohydrin, the resulting product will exhibit a polymeric configuration which is far too complex to be accurately depicted. It is possible to hypothesize, however, that a possible configuration for a typical chain extended product wil correspond to the following:

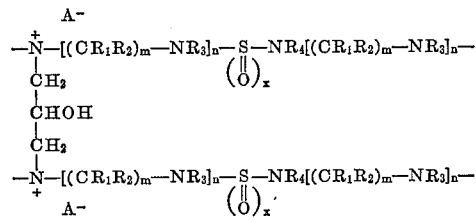

wherein A is a halogen radical and $R_1$, $R_2$, $R_3$, $R_4$, $m$, $n$, and $x$ are as previously described.

DESCRIPTION OF THE PREFERRED EMBODIMENTS

In brief, the procedure primarily utilized for preparing the novel polysulfur amidoamines of this invention comprises reacting: (1) at least one low molecular weight polyamine; with (2) a sulfur-containing reagent selected from the group consisting of sulfur halides, inorganic sulfur amides, sulfur acids and their corresponding anhydrides. Thereafter, if desired, the resulting products may be chain extended by reaction with an epihalohydrin.

The low molecular weight polyamines applicable for use in the process of this invention correspond to the formula:

wherein $R_1$, $R_2$, $R_3$, and $R_4$ are radicals selected from the group consisting of hydrogen, alkyl and cycloalkyl radicals; $m$ is an integer having a value of from 2 to 6 inclusive; and, $n$ is an integer having a value of from 1 to 1000 inclusive. Thus, among the applicable polyamines are included: straight chain polyamines such, for example, as triethylenetetramine, tetraethylenepentamine, tetraethylenediamine, hexamethylenediamine, bishexamethylenetriamine, and pentaethylenehexamine; and, cyclic polyamines such, for example, as piperazine, diaminoethyl piperazine and other substituted piperazines, etc. It should be noted that more than one of the applicable low molecular weight polyamines corresponding to the above formula may be simultaneously present in the reaction system. Thus, if desired, the practitioner may utilize crude residues containing mixtures of amines, e.g. those residues resulting from the interaction between dichloroethane and ammonia, as the polyamine starting material for the novel process of this invention.

With regard to the sulfur-containing reagents which may be utilized in the novel process of this invention, these reagents may be selected from the group consisting of sulfur halides, sulfur acids and their corresponding anhydrides, and inorganic sulfur amides. Specific examples of the latter materials include: sulfur dichloride, thionyl chloride, thionyl bromide, sulfuryl chloride, sulfuryl fluoride, sulfuramide, sulfuric acid, chlorosulfonic acid, and sulfur trioxide.

In more detail, the procedure for the preparation of the novel polysulfur amidoamines of this invention comprises dissolving the low molecular weight polyamine in an equeous or organic solvent and, thereafter, slowly adding the sulfur-containing reagent to the polyamine solution while the latter is under agitation. Suitable organic solvents for this reaction include: benzene, xylene, hexane, dichloroethane, and methyl ethyl ketone, etc. It is left to the discretion of the practitioner to determine the reaction time and temperature which is to be used, although typical reactions may be conducted at temperatures of from about 20 to 100° C. for period of about 1 to 6 hours.

It should be noted that the resulting reaction product will precipitate out of solution when an organic solvent system is utilized in its preparation. These precipitated end products are then typically recovered by means of a procedure wherein water is added to the system in order to dissolve the polymeric product and to completely extract it from the organic solvent, whereupon the thus extracted organic solvent is separated from the system. Regardless of the preparative method which is utilized, the polymeric reaction product is usually retained as an aqueous solution since the latter form is convenient for use in any direct end use application or for any subsequent chemical reaction in which these novel polymeric products may be utilized.

In using an inorganic sulfur amide as the sulfur-containing reagent in the process of this invention, it is merely necessary to heat the sulfur amide with the low molecular weight polyamine in order to obtain the desired polymeric reaction product; the presence of a solvent in the latter reaction system usually being unnecessary. It should be noted that the polymeric reaction products resulting from the latter procedure are free polysulfur amidoamines as opposed to the amidoamine salts which usually result when sulfur halides are utilized in the reaction.

With respect to proportions, the determination of the concentration of the two primary reagents which is to be utilized, as based on the stoichiometric equivalencies of the reaction, is left to the discretion of the practitioner and will depend, of course, on the molecular weight and chain length which is desired in the resulting polysulfur amidoamines.

Thereafter, if desired, the above prepared polysulfur amidoamines may be chain extended merely by being reacted, while in aqueous solution, with an epihalohydrin. All available epihalohydrins, e.g. epichlorohydrin and epibromohydrin, may be utilized in the process of this invention, although epichlorohydrin is the preferred reagent for reasons of economy and availability.

Thus, the selected epihalohydrin is slowly admixed with the aqueous solution of the polysulfur amidoamine and the reaction is allowed to proceed at a temperature of from 30 to 100° C. and a pH level of from about 8 to 10 for a period of from about 1 to 4 hours; the latter pH level being obtained by adding a basic material, such as sodium hydroxide, to the system. Thereafter, the polymeric solution is cooled, diluted with water, and then stabilized by having added thereto sufficient acid to reduce its pH to a level of from about 4 to 6. Any suitable inorganic or organic acid, such as hydrochloric, sulfuric, nitric, oxalic and acetic acids, may be utilized to stabilize the resulting high molecular weight, chain extended, polysulfur amidoamines.

The concentration of reactants to be used in the latter chain extension reaction is also left to the discretion of the practitioner, although the epihalohydrin is typically utilized in a concentration of from about 0.5 to 1.25 moles per each of the secondary nitrogen atoms which is present in the polysulfur amidoamine.

As previously noted, the polysulfur amidoamines of this invention as well as their chain extended products may be effectively used in a variety of applications. Thus, these products may be incorporated into textiles as well as in a large number of synthetic polymeric materials, such as polyvinyl chloride, polyvinyl acetate, polystyrene, polyesters, and polyolefins, etc. wherein they may serve as anti-static agents, anti-oxidants and fire retardants, etc. Furthermore, our novel compositions may be used as adhesion promoters in adhesive systems based, for example, on polyvinyl acetate.

Of particular interest, is the use of these materials as pigment retention aids in paper and as flocculants. Thus, our novel materials have been successfully employed as pigment retention agents for papers prepared from all types of both cellulosic and combinations of cellulosic with non-cellulosic fibers. The celluosic fibers which may be used include bleached and unbleached soda, neutral sulfite, semi-chemical, chemi-ground wood and ground wood; while applicable non-cellulosic fibers include polyamide, polyester and polyacrylic resin fibers as well as mineral fibers such as asbestos and glass. Furthermore, our novel polymeric materials may be effectively used in the presence of a wide variety of paper additives such as clay, talc, titanium dioxide, calcium carbonate, alum, sizing agents and dyes, etc., and may be employed in any of the conventional methods of preparing paper sheets and other paper products.

Thus, in a typical paper making procedure, a slurry of pulp is fed into a beater or through continuous refiners where it is subjected to mechanical beating until it acquires the desired fiber length and degree of hydration. Pigments and other ingredients such as rosin, alum, dyes, etc. may be added before, during or after the latter mechanical processing step and the slurry is thereupon diluted to the desired solids content. While the aqueous solution of our novel polymeric materials may be added to the pulp slurry either before or after the other ingredients have been incorporated therein, it is usually preferable to add them last. After the solution of the polymeric material has been added to the slurry, the latter may then be further diluted. The resulting slurry is then passed onto a moving wire belt or onto a revolving screen-covered cylinder where a self-supporting web is formed. This web is then pressed to further reduce its water content and, after pressing, the sheet travels over a series of revolving steam-heated cylindrical driers.

The novel polymeric materials of this invention may also be employed to remove suspended organic solids from any type of aqueous medium wherein such solids may be encountered. Such media include, for example, raw, untreated water destined for human consumption or industrial use; industrial waste water; or, municipal sewage, etc. In practice, the flocculation procedure is typically conducted by the addition of our novel products to the aqueous medium containing the suspended, finely divided organic solids and, thereafter, separating the resulting flocs from their aqueous media by means of a settling out, filtration, or decantation operation. The distinct advantages derived from the use of our novel products are to be found in the rapid settling rates, low residual turbidities, and large, non-gummy floc formation which accompany their use.

The following examples will further illustrate the embodiment of this invention. In these examples, all parts given are by weight unless otherwise noted.

Example I

This example illustrates the preparation of a typical polythionylamidoamine of this invention.

Thus, 11.9 parts of thionyl chloride were admixed, over a period of two hours at a temperature of 60° C., with an aqueous solution containing 18.9 parts of tetraethylenepentamine in 50 parts of water. The temperature of the reaction mix was thereafter increased to 70° C. as a result of the exothermic nature of the reaction. Heating at the latter 70° C. temperature was then continued for an additional hour.

The polythionylamidopolyamine thus obtained was in the form of an aqueous solution containing 20.4%, by weight, of polymer solids. It exhibited an Intrinsic Viscosity (I.V.), as determined in water at 30° C., of 0.06. An infra-red spectrum of the polymer, which was obtained using a Beckman IR–9 Infrared Spectrophotometer, showed an absorption band at 625 cm.$^{-1}$, thereby indicating the presence of the desired nitrogen-sulfur linkage.

Example II

This example illustrates the preparation of a polysulfurylamiodoamine by means of the process of this invention utilizing, in this instance, an organic solvent reaction system.

Thus, 13.5 parts of sulfuryl chloride were admixed, over a period of two hours at a temperature of 60° C., with a solution containing 14.6 parts of triethylenetramine in 100 parts of benzene. The reaction was allowed to proceed for a further period of one hour at a temperature of 70° C., whereupon the amidoamine product precipitated out of solution. Thereafter, 100 parts of water were added to the system in order to redissolve the latter reaction product and totally extract it from the benzene solvent which, upon the completion of the extraction operation, was separated from the system.

The polysulfurylamidopolyamine thus obtained was in the form of an aqueous solution containing 20%, by weight, of polymer solids. It exhibited an I.V., as determined in water at 30° C., of 0.05.

Example III

This example further illustrates the preparation of a polysulfurylamidoamine typical of the novel products of this invention.

Thus, 70 parts of a polyethylene polyamine residue comprising the non-volatile amine residues resulting from the reaction between ethylene dichloride and ammonia were slowly admixed with 48 parts of sulfuramide and the reaction mixture thereafter heated to a temperature of 80–140° C. for a period of about 3 hours at which point no further ammonia was being evolved by the system. Upon cooling, the resulting polysulfurylamidopolyamine was dissolved in water so as to obtain a solution containing 30%, by weight, of polymer solids. The amidopolyamine exhibited an I.V., as determined in water at 30° C., of 0.07.

Example IV

This example illustrates the preparation of additional polysulfur amidoamines representative of the novel products of this invention.

A number of amidoamine formulations were prepared according to the procedure set forth in Example I, wherein an aqueous reaction system was utilized, and according to the procedure set forth in Example II, wherein an organic solvent reaction system was utilized. These formulations are presented in the following table:

|  | Parts | | | |
|---|---|---|---|---|
| Formulation No | 1 | 2 | 3 | 4 |
| A polyethylene polyamine residue comprising the non-volatile amine residues resulting from the reaction between ethylene dichloride and ammonia | 70 | 70 | 70 | 70 |
| Water | 100 | | 200 | 100 |
| Benzene | | 200 | | |
| Sulfuryl chloride | 34 | 34 | | |
| Thionyl chloride | | | 30 | |
| Sulfur dichloride | | | | 26 |
| Water (for extraction of the product from its benzene system) | | 200 | | |
| Percent by weight of polymer solids | 63.8 | 50.0 | 31.0 | 28.3 |
| I.V., as determined in water at 30° C | 0.07 | 0.04 | 0.06 | 0.06 |

The data presented hereinabove clearly indicate the effectiveness of the process of this invention in the utilization of a variety of polyamines and sulfur-containing reagents.

Example V

This example illustrates the preparation of chain extended polysulfur amidoamines representative of the novel chain extended products of this invention.

Thus, the general procedure utilized in this example involved admixing the polysulfur amidoamine with the following sequence of materials: (1) water; (2) a portion of the total sodium hydroxide concentration utilized in the reaction system, the presence of sodium hydroxide serving to maintain the pH level of the system above about 8 during the reaction; and (3) a portion of the total epichlorohydrin concentration utilized in the reaction, the latter portion being added over a specified period at a temperature of 80° C. The resulting partially reacted system was then admixed, over an additional period of time at a temperature of 80° C., with a second portion of both the sodium hydroxide and the epichlorohydrin. Thereafter, the totally reacted mix was cooled, adjusted to the desired solids content by the addition of water, and stabilized at the desired pH level by the addition of the requisite quantities of acid.

The chain extended products prepared in this example are presented in the following table:

|  | Parts | | |
|---|---|---|---|
| Formulation No | 1 | 2 | 3 |
| Polysulfurylamidopolyamine (as prepared in Example IV-1) | 100 | | |
| Polythionylamidopolyamine (as prepared in Example I) | | 100 | |
| Polysulfuramidopolyamine (as prepared in Example IV-4) | | | 75 |
| Water initially added to the system | 100 | | 25 |
| First addition: | | | |
| Epichlorohydrin | 30 | 11.8 | 5.9 |
| 25%, by weight, aqueous sodium hydroxide solution | 15.5 | 13.4 | 17.6 |
| Second addition: | | | |
| Epichlorohydrin | 30 | 17.2 | 5.9 |
| 25%, by weight, aqueous sodium hydroxide solution | 8 | 21.3 | 13.2 |
| Additional water | 220 | 270 | 200 |
| A 15% by weight aqueous nitric acid solution | | 100 | |
| A 35% by weight aqueous nitric acid solution | 40 | | 17 |
| pH level of the reaction system | 10 | 10 | 10 |
| First epichlorohydrin addition period (hours) | 2 | 2 | 2 |
| Second epichlorohydrin addition period (hours) | 2 | 2 | 1 |
| pH level of stabilized product | 4 | 4 | 4 |
| Solids content of product (percent by weight) | 25.9 | 14.7 | 11.8 |
| I.V. of product, as determined in water at 30° C | 0.33 | 0.20 | 0.23 |

The data summarized above clearly indicate the effectiveness of the process of this invention in preparing a variety of chain extended polysulfur amidoamine products.

The amination procedure described in Example II and the subsequent chain extension reaction described hereinabove were then repeated with the exception that: (a) a mixture of amines comprising hexamethylene diamine, bis-hexamethylene triamine and higher homologues of each of the latter amines; and, (b) a polyethylene amine residue comprising a mixture of pentaethylenehexamine, diaminoethyl triaminoethylamine, diaminoethyl triethylenetetramine, aminoethyl piperazine and higher homologues of each of the latter polyethylene amines; were each, respectively, utilized as the polyamine reagent therein. The resulting polysulfurylamidoamines as well as the chain extended products thereof were comparable to the reaction products previously prepared.

Summarizing, it is thus seen that this invention provides for the preparation of novel, high molecular weight polysulfur amidoamine compositions as well as the chain extended products thereof.

Variations may be made in procedures, proportions and materials without departing from the scope of this invention which is defined by the following claims.

What we claim is:

1. A sulfur-containing polyamine composition having a repetitive chemical structure corresponding to the formula

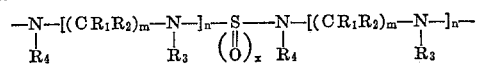

said composition resulting from the reaction between:
(1) at least one low molecular weight polyamine corresponding to the formula

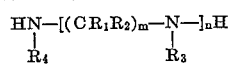

and,
(2) a sulfur-containing reagent selected from the group consisting of sulfur halides, inorganic sulfur amides, sulfur acids and their corresponding anhydrides; wherein $R_1$, $R_2$, $R_3$ and $R_4$ are radicals selected from the group consisting of hydrogen, alkyl and cycloalkyl radicals;
$m$ is an integer having a value of from 2 to 6 inclusive;
$n$ is an integer having a value of from 1 to 1000 inclusive; and
$x$ is an integer having a value of from 0 to 2 inclusive.

2. A sulfur-containing polyamine composition comprising the reaction product of thionyl chloride and tetraethylenepentamine.

3. A sulfur-containing polyamine composition comprising the reaction product of sulfuryl chloride and triethylenetetramine.

4. A sulfur-containing polyamine composition comprising the reaction product of: (a) sulfuramide and (b) a polyethylene polyamine residue comprising the non-volatile amine residues resulting from the reaction between ethylene dichloride and ammonia.

5. A sulfur-containing polyamine composition comprising the reaction product of: (a) sulfuryl chloride; and (b) a polyethylene polyamine residue comprising the non-volatile amine residues resulting from the reaction between ethylene dichloride and ammonia.

6. A sulfur-containing polyamine composition comprising the reaction product of: (a) thionyl chloride; and (b) a polyethylene polyamine residue comprising the non-volatile amine residues resulting from the reaction between ethylene dichloride and ammonia.

7. A sulfur-containing polyamine composition comprising the reaction product of: (a) sulfur dichloride; and (b) a polyethylene polyamine residue comprising the non-volatile amine residues resulting from the reaction between ethylene dichloride and ammonia.

8. A process for the preparation of sulfur-containing polyamine compositions having a repetitive chemical structure corresponding to the formula

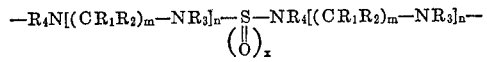

wherein $R_1$, $R_2$, $R_3$ and $R_4$ are radicals selected from the group consisting of hydrogen, alkyl and cycloalkyl radicals;

$m$ is an integer having a value of from 2 to 6 inclusive;
$n$ is an integer having a value of from 1 to 1000 inclusive; and
$x$ is an integer having a value of from 0 to 2 inclusive;

said process comprising the steps of admixing and subsequently reacting: (1) at least one low molecular weight polyamine corresponding to the formula $$R_4HN[(CR_1R_2)_m—NR_3]_nH$$

wherein $R_1$, $R_2$, $R_3$ and $R_4$ are radicals selected from the group consisting of hydrogen, alkyl and cycloalkyl radicals; $m$ is an integer having a value of from 2 to 6 inclusive; and $n$ is an integer having a value of from 1 to 1000 inclusive; and (2) a sulfur-containing reagent selected from the group consisting of sulfur halides, inorganic sulfur amides, sulfur acids and their corresponding anhydrides.

9. The polymeric product resulting from the reaction of an epihalohydrin with a sulfur-containing polyamine composition having a repetitive chemical structure corresponding to the formula

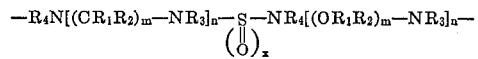

wherein $R_1$, $R_2$, $R_3$ and $R_4$ are radicals selected from the group consisting of hydrogen, alkyl and cycloalkyl radicals;

$m$ is an integer having a value of from 2 to 6 inclusive;
$n$ is an integer having a value of from 1 to 1000 inclusive; and
$x$ is an integer having a value of from 0 to 2 inclusive.

10. A process for the preparation of polymeric compositions which comprise the reaction product of an epihalohydrin with a sulfur-containing polyamine composition having a repetitive chemical structure corresponding to the formula

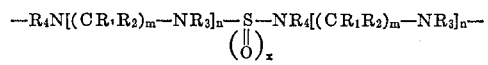

wherein $R_1$, $R_2$, $R_3$ and $R_4$ are radicals selected from the group consisting of hydrogen, alkyl and cycloalkyl radicals;

$m$ is an integer having a value of from 2 to 6 inclusive;
$n$ is an integer having a value of from 1 to 1000 inclusive; and
$x$ is an integer having a value of from 0 to 2 inclusive;

said process comprising the steps of admixing and subsequently reacting: (1) at least one low molecular weight polyamine corresponding to the formula $$R_4HN[(CR_1R_2)_m—NR_3]_nH$$

wherein $R_1$, $R_2$, $R_3$ and $R_4$ are radicals selected from the group consisting of hydrogen, alkyl and cycloalkyl radicals; $m$ is an integer having a value of from 2 to 6 inclusive; and $n$ is an integer having a value of from 1 to 1000 inclusive; and (2) a sulfur-containing reagent selected from the group consisting of sulfur halides, inorganic sulfur amides, sulfur acids and their corresponding anhydrides; and, thereafter reacting the resulting polyamine composition with an epihalohydrin at a pH level of from about 8 to 10.

References Cited

UNITED STATES PATENTS

| | | | |
|---|---|---|---|
| 3,040,098 | 6/1962 | Stone | 260—583 |
| 3,275,588 | 9/1966 | Garms | 260—29.2 |
| 3,370,048 | 2/1968 | Reynolds | 260—79.3 |

DONALD E. CZAJA, Primary Examiner

M. I. MARQUIS, Assistant Examiner

U.S. Cl. X.R.

260—2, 793, 874, 899, 896, 823, 860; 210—51, 54; 162—164